US012025700B2

(12) United States Patent
Chaudhry et al.

(10) Patent No.: US 12,025,700 B2
(45) Date of Patent: *Jul. 2, 2024

(54) SYSTEM AND METHOD FOR DETERMINING RANGES TO A TARGET BEHIND A TRANSPARENT SURFACE

(71) Applicant: Aeva, Inc., Mountain View, CA (US)

(72) Inventors: Humayun Chaudhry, Gainesville, VA (US); Christopher Thompson, Alexandria, VA (US)

(73) Assignee: Aeva, Inc., Mountain View, CA (US)

( * ) Notice: Subject to any disclaimer, the term of this patent is extended or adjusted under 35 U.S.C. 154(b) by 772 days.

This patent is subject to a terminal disclaimer.

(21) Appl. No.: 17/007,049

(22) Filed: Aug. 31, 2020

(65) Prior Publication Data

US 2021/0173081 A1 Jun. 10, 2021

Related U.S. Application Data

(63) Continuation of application No. 15/822,285, filed on Nov. 27, 2017, now Pat. No. 10,761,210, which is a
(Continued)

(51) Int. Cl.
*G01C 3/08* (2006.01)
*G01S 7/487* (2006.01)
*G01S 17/08* (2006.01)

(52) U.S. Cl.
CPC ............ *G01S 17/08* (2013.01); *G01S 7/487* (2013.01)

(58) Field of Classification Search
CPC ............................. G01S 17/08; G01S 17/487
See application file for complete search history.

(56) References Cited

U.S. PATENT DOCUMENTS 5,760,887 A * 6/1998 Fink .................. G01S 17/10
356/5.03
9,829,578 B2 * 11/2017 Chaudhry ............ G01S 7/487
(Continued)

FOREIGN PATENT DOCUMENTS

AT 513402 B1 * 9/2014 ............ G01S 17/10

*Primary Examiner* — Mark Hellner
(74) *Attorney, Agent, or Firm* — Toering Patents PLLC

(57) ABSTRACT

Systems and methods for determining ranges to a target disposed behind a transparent surface are described. A target acquisition system receives a plurality of lidar returns, at least some of which are from a target and at least some of which are from a transparent surface. The lidar returns correspond to a portion of a lidar signal generated by a lidar, directed toward the target, and reflected back to the lidar from either the target or the transparent surface. A range measurement for each of the plurality of lidar returns is determined. The target acquisition system generates a histogram of the range measurements. The histogram includes an array including a plurality of range bins. Each range bin defines a unique portion of a predetermined distance out from the lidar. The histogram further includes a count associated with each respective range bin. The count corresponds to a number of range measurements falling within the unique portion of the predetermined distance corresponding to that respective range bin. In some implementations of the invention, the target acquisition system determines which of the range measurements correspond to the target based on the histogram. In some implementations of the invention, the target acquisition system determines which of the range measurements correspond to the transparent surface based on the histogram.

14 Claims, 3 Drawing Sheets

Related U.S. Application Data continuation of application No. 14/732,656, filed on Jun. 5, 2015, now Pat. No. 9,829,578.

(56) References Cited

U.S. PATENT DOCUMENTS

| | | | |
|---|---|---|---|
| 10,761,210 B2* | 9/2020 | Chaudhry | G01S 7/487 |
| 2004/0070748 A1* | 4/2004 | Inaba | G01S 17/10 |
| | | | 356/5.01 |
| 2011/0246116 A1* | 10/2011 | Kamitani | G01C 3/00 |
| | | | 702/159 |

* cited by examiner

SYSTEM AND METHOD FOR DETERMINING RANGES TO A TARGET BEHIND A TRANSPARENT SURFACE

CROSS-REFERENCE TO RELATED APPLICATIONS

This Application is a continuation application of U.S. patent application Ser. No. 15/822,285, which was filed on Nov. 27, 2017, now U.S. Pat. No. 10,761,210; which in turn is a continuation of U.S. patent application Ser. No. 14/732,656, which was filed on Jun. 6, 2015, now U.S. Pat. No. 9,829,578. Each of the foregoing applications is incorporated herein by reference in its entirety.

Field of the Invention

The invention is generally related to detecting targets, including faces, in an uncontrolled environment, and more particularly, to determining a range to a target located behind a transparent surface, such as glass.

BACKGROUND OF THE INVENTION

Conventional facial detection and recognition techniques attempt to locate and acquire a target, such as a face, in an uncontrolled environment. In some of such environments, a transparent surface may be disposed between the target and an acquisition system, such as a lidar (i.e., laser radar). For example, the target may be on an other side of a transparent storefront in a retail environment, behind a windshield or other window in a vehicle checkpoint environment, or behind some other transparent surface in another environment as would be appreciated.

In such environments, the acquisition system may receive return signals from the transparent surface, from material on the transparent surface, from the target, from other objects, or any combination thereof. Determining which of these return signals corresponds to measurements of a range to the target, as opposed to the transparent surface, etc., is difficult.

What is needed is an improved system and method for determining range to a target located behind a transparent surface.

SUMMARY OF THE INVENTION

Various implementations of the invention relate to determining range to a target located behind a transparent surface. In some implementaions of the invention, a target acquisition system receives a plurality of lidar returns, at least some of which are from a target and at least some of which are from a transparent surface. The lidar returns correspond to a portion of a lidar signal generated by a lidar, directed toward the target, and reflected back to the lidar from either the target or the transparent surface. A range measurement for each of the plurality of lidar returns is determined. In some implementations of the invention, the target acquisition system generates a histogram of the range measurements. Such a histogram includes an array including a plurality of range bins. Each range bin defines a unique portion of a predetermined distance out from the lidar. The histogram further includes a count associated with each respective range bin. The count corresponds to a number of range measurements falling within the unique portion of the predetermined distance corresponding to that respective range bin. In some implementations of the invention, the target acquisition system determines which of the range measurements correspond to the target based on the histogram. In some implementations of the invention, the target acquisition system determines which of the range measurements correspond to the transparent surface based on the histogram.

These implementations, their features and other aspects of the invention are described in further detail below.

DETAILED DESCRIPTION

Detecting and subsequently identifying (or recognizing) a face of a target in an uncontrolled environment is challenging, especially in an uncontrolled outdoor environment. First, the target is free to move into, out of, and within a field of view of the camera, at a variety of ranges and any number of other motion factors as would be appreciated. Second, illumination of the target differs by weather, time of day, orientation of the target, objects in the environment, and any number of other illumination factors as would be appreciated. Third, having the target inside a vehicle dramatically increases the challenges by introducing vehicle type, vehicle motion, location of the target in the vehicle, window tinting, reflections, sunroofs, interior lighting, and any number of other vehicle factors as would be appreciated. Other factors provide further challenges to detecting faces in the uncontrolled environment.

Figure 1:
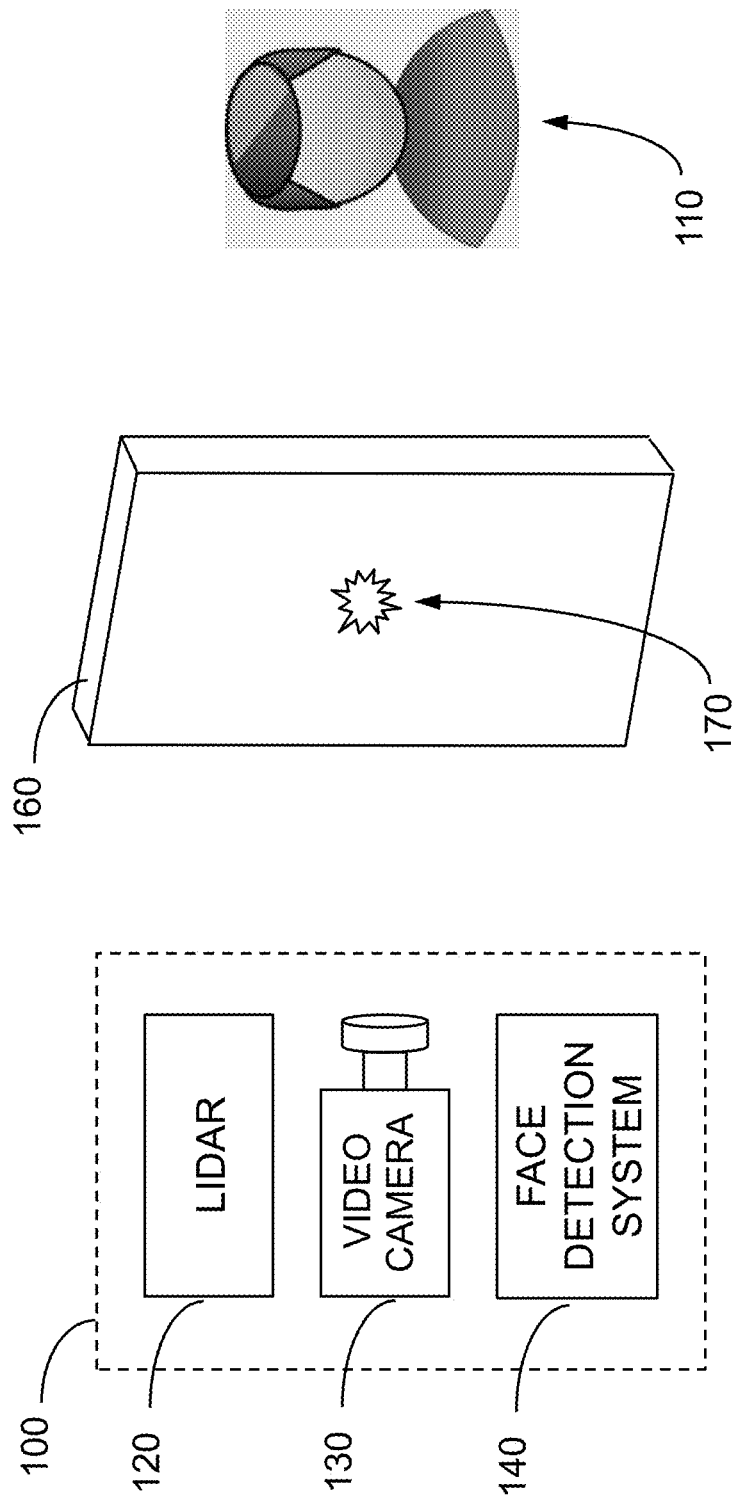
FIG. 1 illustrates a target acquisition system and an environment in which it operates according to various implementations of the invention.

FIG. 1 illustrates a target acquisition system 100 according to various implementations of the invention. In some implementations of the invention, target acquisition system 100 includes a lidar system 120. In some implementations of the invention, lidar 120 is a dual chirp lidar that includes two or more beams, each of which provides measurements of a range and a Doppler velocity for each of various points on a surface of a target. Such a multi-beam, dual chirp lidar is available from Digital Signal Corporation, Chantilly, Virginia, and is described in U.S. Pat. No. 8,717,545 to Sebastian et al., which is incorporated herein by reference in its entirety.

In some implementations of the invention, target acquisition system 100 combines lidar 120 with a video camera 130. In some implementations of the invention, camera 130 includes a digital camera. In some implementations of the invention, camera 130 includes a digital video camera. In any of the above-described implementations of the invention, camera 130 includes an infrared camera. Camera 130 captures and outputs one or more acquired images (sometimes referred to as an image stream) of a scene. Images 135 may capture a target 110, or a face of target 110, in the scene as would be appreciated. Such a combined lidar 120 and video camera 130 is also available from Digital Signal Corporation, Chantilly, Virginia, and is also described in U.S. Pat. No. 8,717,545.

In some implementations of the invention, target acquisition system 100 comprises a face detection system 140. In some implementations of the invention, face detection system 140 detects a face (or other target) in the scene, and attempts to obtain a three-dimensional image (i.e., a collection of three-dimensional measurements) of the face based on the range and Doppler velocity measurements from lidar 120. In some implementations of the invention, face detection system 140 detects a face (or other target or other feature of a target) in the scene, and attempts to obtain a three-dimensional image of the face based on the range and Doppler velocity measurements from lidar 120 and images from camera 130.

In some implementations of the invention, face detection system 140 may comprise various hardware, software, firmware and/or any combination thereof that may be configured to perform various functions, including the functions described herein, as would be appreciated. Once so configured, facial detection system 140 becomes a particular machine configured to implement various features and aspects of the invention as would be appreciated. In some implementations of the invention, facial detection system 140 includes a computing processor and a memory (not otherwise illustrated), where the memory is configured to store instructions that, when executed by the computing processor, implement and/or perform various features and aspects of the invention, again, as would be appreciated.

In some environments, target 110 is disposed on the other side of a transparent surface 160 from target acquisition system 100. In some implementations of the invention, transparent surface 160 may include various types of transparent glass, plastic, or similar transparent or semi-transparent materials as would be appreciated. In some implementations of the invention, transparent surface 160 may be transparent to frequencies associated with lidar 120 but not necessarily video camera 130 as would be appreciated. In some implementations of the invention, transparent surface 130 may be a windshield or other window of a vehicle. In some implementations of the invention, transparent surface 130 may be an exterior transparent surface (e.g., window, door, etc.) of a building such as, but not limited to, an office, a house, a restaurant or other building as would be appreciated. In some implementations of the invention, transparent surface 130 may be an interior transparent surface in a building such as, but not limited to, an interior office window, an interior door, a partition, a screen, a wall of a security, a wall of a customs area, or other interior transparent surface as would be appreciated.

As discussed above, in the environment illustrated in FIG. 1, lidar 120 may receive lidar returns from transparent surface 160, from target 110, or from both transparent surface 160 and target 110, and/or other objects in the environment (not otherwise illustrated). In some environments, lidar 120 may also receive lidar returns from dirt 170 on transparent surface 160. As would be appreciated, lidar 120 generates a range measurement for each of the received lidar returns. Depending upon the environment, target 110 may be a few inches or several feet from transparent surface. The variety of the lidar returns in connection with an unknown proximity of lidar 120 to transparent surface 160 and to target 110, as well as an unknown proximity of target 110 to transparent surface, may make detecting target 110, and subsequently obtaining an accurate three-dimensional image of target 110 difficult. More particularly, the variety of possible lidar returns makes it difficult to determine which lidar returns belong to transparent surface 160 and which belong to target 110.

Figure 2:
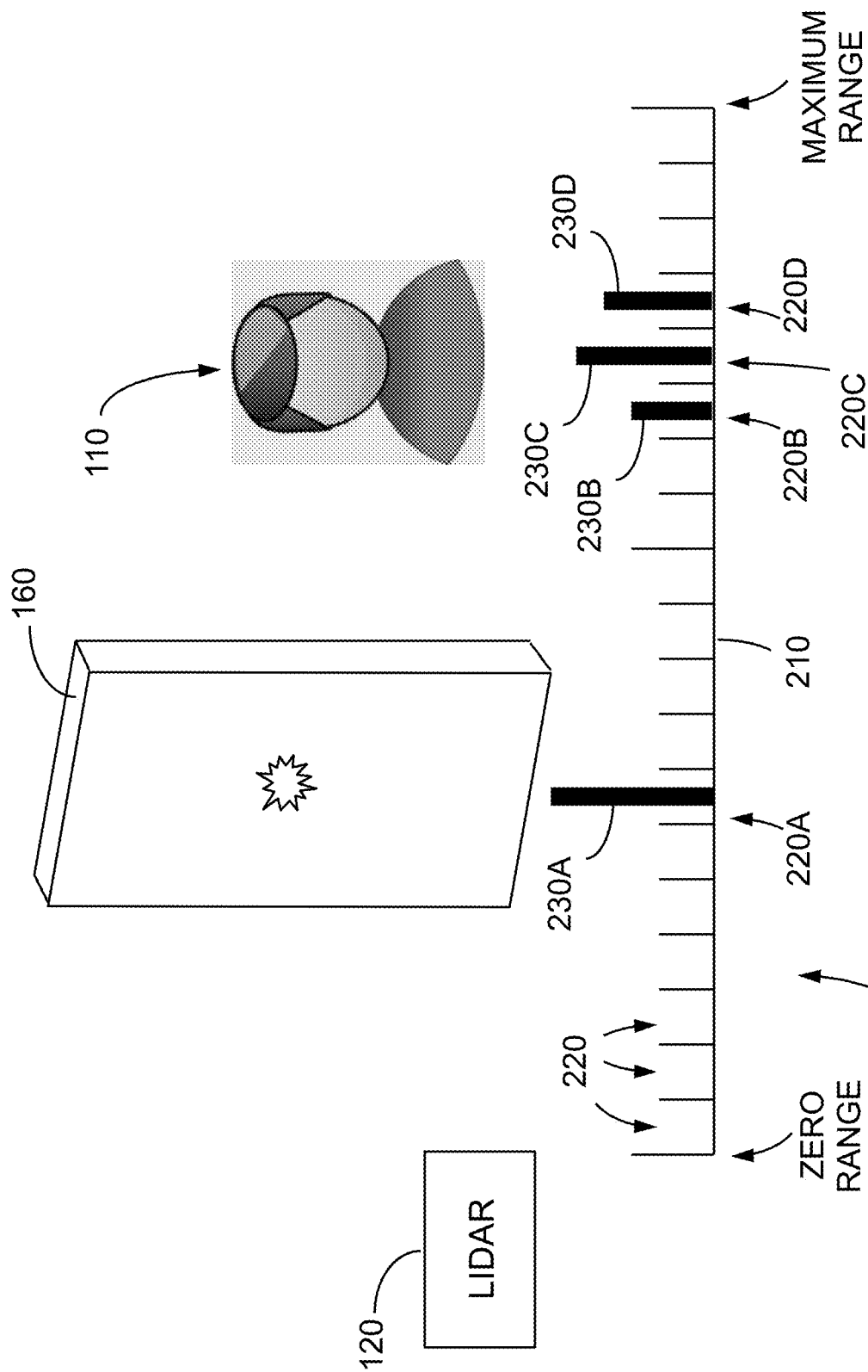
FIG. 2 illustrates a histogram useful to target acquisition system according to various implementations of the invention.

According to various implementations of the invention, face detection system 140 utilizes a histogram 200 such as that illustrated in FIG. 2. Histogram 200 may comprise an array 210 including a plurality of range bins 220. An anticipated maximum range between lidar 120 and target 110 is typically known or specified. This maximum range may be divided into a number of range segments, each having a range width corresponding to a portion of the maximum range. Each range bin 220 may be assigned to one of the range segments, and then array 210, which includes all of range bins 220, corresponds to an extend of the entire maximum range. While not illustrated in FIG. 2, array 210 may have a non-zero minimum range in instances where target 110 is not expected at ranges closer than the non-zero minimum range as would be appreciated.

As each range measurement is generated, face detection system 140 places the range measurement in an appropriate range bin 220 based on the range segment within which the range measurement falls. In some implementations of the invention, in doing so, face detection system 140 increments a counter associated with the appropriate range bin 220. In this manner, range measurements are sorted and counted based on the range bin 220 within which they fall. As illustrated in FIG. 2, a number of range measurements fall within range bins 220A, 220B, 220C and 220D as evidenced by their corresponding counters 230A, 230B, 230C and 230D, respectively. In some implementations of the invention, a lidar return received by lidar 120 may have a signal-to-noise ratio that exceeds a certain threshold before the range measurement associated with that lidar return is added to histogram 200.

As additional range measurements are generated, sorted and counted into array 210, clusters of range bins 220 may begin to form. For example, in FIG. 2, a first cluster of range bins formed corresponds to bin 220A and a second cluster of bins formed corresponds to bins 220B, 220C, and 220D. As illustrated, in some, though not all, implementations of the invention, range measurements associated with transparent surface 160 tend to fall within a relatively fewer number of range bins 220; whereas range measurements associated with target 110 tend to fall within a relatively greater number of range bins 220. This is as expected because transparent surface 160 is typically thin and typically uniform relative to a surface of target 110.

According to various implementations of the invention, a nearest cluster in histogram 200 is deemed to be those range measurements associated with transparent surface 160, and a second nearest cluster in histogram 200 is deemed to be those range measurements associated with target 110. In some implementations of the invention, where transparent surface 160 generates few, if any, range measurements and only a single cluster is formed in histogram 200, this single cluster may be deemed to be those range measurements associated with target 110.

According to various implementations of the invention, once a cluster of bins in histogram 200 is deemed to be associated with target 110, range measurements outside this cluster may be filtered as extraneous and in some implementations, ignored.

In some implementations of the invention, a cluster corresponds to those contiguous bins 220 in histogram 200 for which corresponding counter 230 exceeds a certain threshold. As would be appreciated, lidar 120 may be subject to noise, which may result in spurious range measurements being sorted and counted into histogram 200. In an effort to reduce any negative impact of such noise, in some implementations of the invention, only those bins whose counter exceeds a certain threshold may be considered for purposes of clustering as would be appreciated.

In some implementations of the invention, other surfaces may also be disposed between lidar 120 and target 110. For example, when target 110 is inside a vehicle, lidar 120 may receive returns from other vehicle components such as, but not limited to, a sun visor, a dashboard, a steering wheel, etc. These vehicle components may result in range measurements that also form clusters in histogram 200. In many cases, these vehicle components will reside closer to transparent surface 160 as opposed to target 110 and may be discriminated accordingly. However, in some cases, such as when these vehicle components include neck rests, seat backs, back seats, rear windows, etc., target 110 may reside closer to transparent surface 160 than such vehicle components as would be appreciated. Of course, even with clusters corresponding to such vehicle components in histogram 200, target 110 should typically correspond to the second nearest cluster in histogram 200.

Various implementations of the invention attempt to locate, detect and focus on target 110 before a high resolution or high quality image of target 110 is generated. Various implementations of the invention attempt to locate target 110 on the other side of transparent surface 160 in order to subsequently determine and provide an optimal set of camera settings at the onset of (and in some implementations during) acquisition of a high quality image of target 110, such as a three-dimensional image of the face, as described in co-pending U.S. patent application Ser. No. 14/732,657, entitled "System and Method for Intelligent Camera Control," filed on even date herewith, and which is incorporated herein by reference in its entirety.

In some implementations of the invention, target acquisition system 100 may operate in a detection phase during which target acquisition system 100 detects target 110 in the environment and an acquisition phase during which a high quality image of target 110 is acquired or captured. In some implementations, during the detection phase, lidar 120 may not scan its beams until target is detected and optimal camera settings for video camera 130 are determined. Rather than scan its beams, lidar 120 may simply direct two or more beams toward a particular region in the environment and attempt to detect target 110. In some implementions, during the acquisition phase, lidar 120 scans target 110 while video camera 130, adjusted with optimal camera settings, captures images of target 110 to obtain a high quality three dimensional image of target 110. One problem associated with lidar 120 not scanning its beams during the detection phase is that the beams of lidar 120 may be directed to dirt 170 or some other non-transparent material disposed on transparent surface 160. In order to accommodate for such a contingency, in some implementations of the invention, lidar 120 directs its beams at a first spot on transparent surface 160, gathers a number of range measurements, directs its beams to a second spot on transparent surface 160, where the second spot is a few centimeters or a few inches from the first spot, and gathers a number of additional range measurements. This may be repeated any number of times as would be appreciated. In some implementations of the invention, lidar 120 directs its beams to three separate spots on transparent surface 160 in order to avoid complications caused by dirt 170. As would be appreciated, the spots may be separated vertically, horizontally, or a combination thereof.

Figure 3:
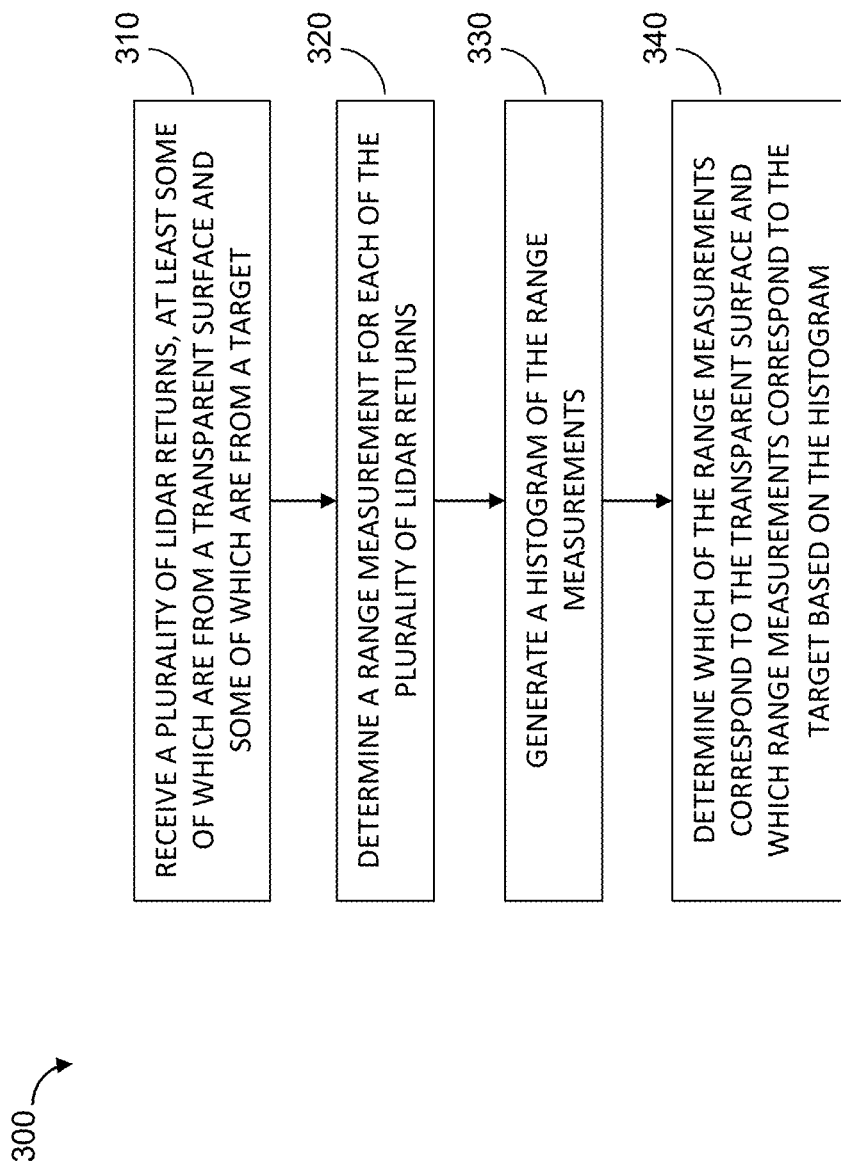
FIG. 3 illustrates an operation of the target acquisition system according to various implementations of the invention.

FIG. 3 illustrates an operation 300 of face detection system 140 according to various implementations of the invention. In an operation 310, face detection system 140 receives a plurality of lidar returns from lidar 120. In some implementations of the invention, these lidar returns correspond to portions of lidar signals reflected back from transparent surface 160 or target 110 or both and received by lidar 120.

In an operation 320, a range measurement for each of the received lidar returns is determined. In some implementations of the invention, lidar 120 determines these range measurements and provides them to face detection system 140. In some implementations of the invention, lidar 120 forwards the lidar returns to face detection system 140 and face detection system 140 determines the corresponding range measurements.

In an operation 330, face detection system 140 generates a histogram 200 of the range measurements. According to various implementations of the invention, histogram 200 includes array 210 of range bins 220, where each range bin 220 corresponds to a unique portion of the anticipated maximum distance between lidar 120 and target 110, and where each range bin includes a counter indicative of the number of range measurements that fall within that range bin 220.

In an operation 340, face detection system 140 determines, based on histogram 200, which range measurements correspond to target 110. In some implementations of the invention, in order to determine which range measurement correspond to target 110, face detection system 140 identifies clusters that are formed in histogram 200, where each cluster corresponds to one or more adjacent range bins 220 each of which's counter exceeds a predetermined threshold, as would be appreciated. In some implementations of the invention, face detection system 140 determines the nearest cluster (i.e., the cluster of range bins 220 having a range closest to lidar 120) as corresponding to transparent surface 160 and determines the second nearest cluster (i.e., the cluster of range bins 220 having a range second closest to lidar 120) as corresponding to target 110. In some implementations of the invention in which transparent surface 160 provides little, if any, lidar return and hence no cluster is formed in histogram 200, face detection system 140 determines the nearest cluster as corresponding to target 110 as would be appreciated. In some implementations of the invention, other determinations may be made depending on the environment and in which cluster target 110 might be expected.

In some implementations of the invention, in a subsequent operation (not otherwise illustrated), face detection system 140 filters range measurements corresponding to target 110 thereby in effect eliminating range measurements not corresponding to target 110.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for determining ranges to a target disposed behind a transparent surface, the method comprising:
receiving a plurality of lidar returns, at least some of which are from a target and at least some of which are from a transparent surface, the lidar returns corresponding to a portion of a lidar signal generated by a lidar, directed toward the target, and reflected back to the lidar from either the target or the transparent surface;

determining a range measurement for each of the plurality of lidar returns;

generating a histogram of the range measurements, the histogram comprising an array including a plurality of range bins, each range bin defining a unique portion of a predetermined distance from the lidar, the histogram further comprising a count associated with each respective range bin, the count corresponding to a number of range measurements falling within the unique portion of the predetermined distance corresponding to that respective range bin; and determining which of the range measurements correspond to the target based on the histogram.

2. The method of claim 1, further comprising:

determining which of the range measurements correspond to the transparent surface based on the histogram.

3. The method of claim 1, wherein determining which of the range measurements correspond to the target based on the histogram comprises:

arranging the plurality of range bins of the histogram into one or more clusters of adjacent range bins, each range bin having its associated count greater than a predetermined threshold.

4. The method of claim 3, wherein determining which of the range measurements correspond to the target based on the histogram comprises:

arranging the plurality of range bins of the histogram into two or more clusters of adjacent range bins, and wherein determining which of the range measurements correspond to the target based on the histogram comprises determining that the range measurements associated with a second nearest one of the two or more clusters correspond to the target.

5. The method of claim 4, further comprising determining that the range measurements associated with a nearest one of the two or more clusters correspond to the transparent surface.

6. The method of claim 1, wherein receiving a plurality of lidar returns comprises:

receiving a plurality of lidar returns from the lidar when one or more lidar beams are directed toward a first spot;

causing the one or more lidar beams of the lidar to be directed toward a second spot; and receiving a plurality of lidar returns from the lidar when one or more lidar beams are directed toward the second spot.

7. A system for determining ranges to a target disposed behind a transparent surface comprising:

a lidar configured to direct a lidar signal toward a target and to receive a plurality of lidar returns, the plurality of lidar returns corresponding to a portion of the lidar signal reflected back to the lidar from either the target or a transparent surface, wherein at least some of the plurality of lidar returns are from the target and at least some of the plurality of lidar returns are from the transparent surface; and a processor configured to:

determine a range measurement for each of the plurality of lidar returns;

generate a histogram of the range measurements, the histogram comprising an array including a plurality of range bins, each range bin defining a unique portion of a predetermined distance outward from the lidar, the histogram further comprising a count associated with each respective range bin, the count corresponding to a number of range measurements falling within the unique portion of the predetermined distance corresponding to that respective range bin;

determining which of the range measurements correspond to the target based on the histogram.

8. The system of claim 7, wherein the processor is further configured to:

determine which of the range measurements correspond to the transparent surface based on the histogram.

9. The system of claim 7, wherein the processor configured to determine which of the range measurements correspond to the target based on the histogram comprises the processor configured to arrange the plurality of range bins of the histogram into one or more clusters of adjacent range bins, each range bin having its associated count greater than a predetermined threshold.

10. The system of claim 9, wherein the processor configured to determine which of the range measurements correspond to the target based on the histogram comprises the processor configured to arrange the plurality of range bins of the histogram into two or more clusters of adjacent range bins, and wherein the processor configured to determine which of the range measurements correspond to the target based on the histogram comprises the processor configured to determine that the range measurements associated with a second nearest one of the two or more clusters correspond to the target.

11. The system of claim 10, wherein the processor is further configured to determine that the range measurements associated with a nearest one of the two or more clusters correspond to the transparent surface.

12. The system of claim 7, wherein the processor configured to receive a plurality of lidar returns comprises the processor configured to:

receive a plurality of lidar returns from the lidar when one or more lidar beams are directed toward a first spot;

cause the one or more lidar beams of the lidar to be directed toward a second spot; and receive a plurality of lidar returns from the lidar when one or more lidar beams are directed toward the second spot.

13. A method for determining ranges to a target disposed behind a transparent surface, the method comprising:

receiving a plurality of lidar returns, at least some of which are from a target and at least some of which are from a transparent surface, the lidar returns corresponding to a portion of a lidar signal generated by a lidar, directed toward the target, and reflected back to the lidar from either the target or the transparent surface;

determining a range measurement for each of the plurality of lidar returns;

generating a histogram of the range measurements, the histogram comprising an array including a plurality of range bins, each range bin defining a unique portion of a predetermined distance from the lidar, the histogram further comprising a count associated with each respective range bin, the count corresponding to a number of range measurements falling within the unique portion of the predetermined distance corresponding to that respective range bin;

generating at least two clusters of adjacent range bins in the histogram for which the associated count exceeds a threshold;

determining that a nearest of the at least two clusters corresponds to the transparent surface; and determining that a second nearest of the at least two clusters corresponds to the target.

14. The method of claim 13, further comprising filtering out those range measures that do not correspond to the target.

\* \* \* \* \*